J. G. AND H. W. AMBROSE.
SPRINKLER.
APPLICATION FILED MAY 2, 1919.
1,335,267. Patented Mar. 30, 1920.
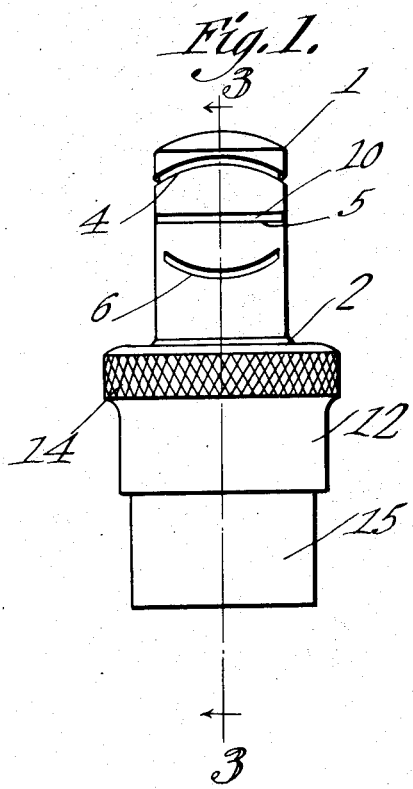
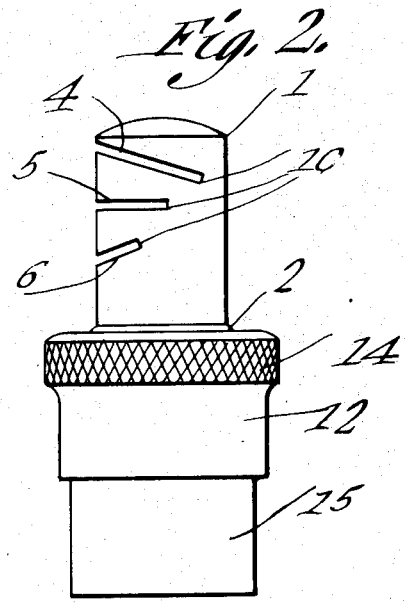
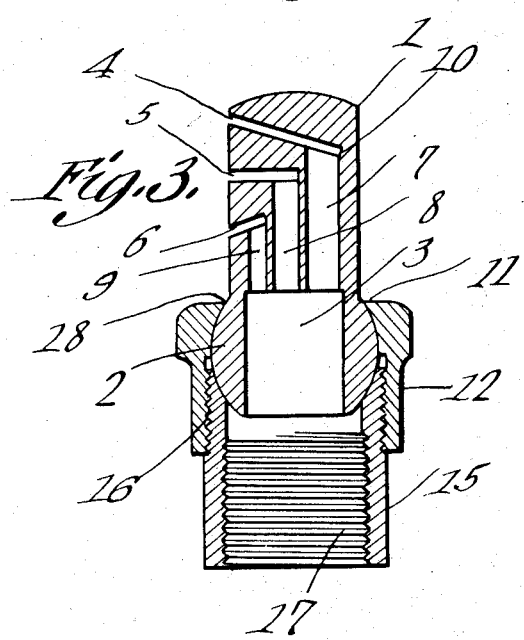
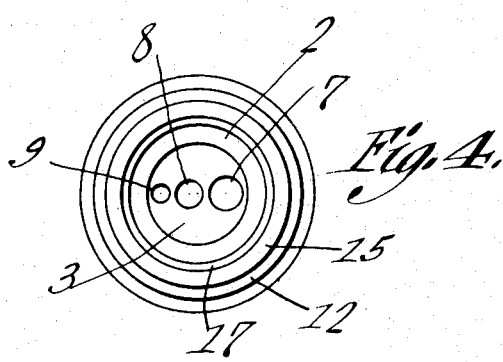
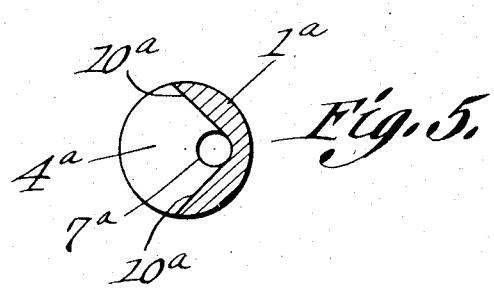
Inventor
J. G. Ambrose and
H. W. Ambrose
By C. A. Snow & Co.
Attorneys
Witness

UNITED STATES PATENT OFFICE.

JENNINGS GRANT AMBROSE AND HENRY W. AMBROSE, OF SAN DIEGO, CALIFORNIA.

SPRINKLER.

1,335,267.  Specification of Letters Patent.  Patented Mar. 30, 1920.

Application filed May 2, 1919. Serial No. 294,320.

*To all whom it may concern:*

Be it known that we, JENNINGS GRANT AMBROSE and HENRY W. AMBROSE, citizens of the United States, residing at San Diego, in the county of San Diego, State of California, have invented a new and useful Sprinkler, of which the following is a specification.

The device forming the subject matter of this application is a nozzle, adapted to be used primarily but not exclusively, as a lawn and garden sprinkler, and the invention aims to provide a simple structure which will throw a spray in any desired direction, without wetting the operator.

Another object of the invention is to provide a device of the kind mentioned which will prevent a waste of water, and confine the sprinkling to the area which needs to be sprinkled, the construction being such that, by shaping the slots properly, oddly shaped pieces of ground may be watered without waste.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment shown can be made without departing from the spirit of the invention.

In the accompanying drawings:—

Figure 1 shows in front elevation, a device constructed in accordance with the invention; Fig. 2 is a side elevation; Fig. 3 is a longitudinal section on the line 3—3 of Fig. 1; Fig. 4 is a bottom plan; and Fig. 5 is a cross section showing a modification.

In carrying out the invention as disclosed in Figs. 1, 2, 3 and 4, there is provided a head 1 supplied at its lower end with a ball 2 having a chamber 3. In the side of the head 1 slots 4, 5 and 6 are formed. These slots may be constructed variously, without jeopardizing the utility of the invention. Preferably, the slots 4 and 6 slant toward each other, at an acute angle to the axis of the head 1, whereas the slot 5 is disposed at right angles to the axis of the head. A relatively large passage 7 extends longitudinally of the head 1 and forms a communication between the chamber 3 and the slot 4. A smaller passage 8 forms a communication between the chamber 3 and the slot 5. A still smaller passage 9 establishes communication between the chamber 3 and the slot 6. The passages 7, 8 and 9 preferably are disposed in alinement as shown in Fig. 4, the slot 5 being cut into the head 1 more deeply than is the slot 6, and the slot 4 being cut into the head 1 more deeply than is the slot 5, in order that the slots may communicate with the respective passages 7, 8 and 9 which, as hereinbefore explained are located in alinement, one behind the other. The rear walls of the slots 4, 5 and 6 may be straight, as shown at 10.

The numeral 12 marks a tubular body provided at one end with an opening 18 and having a flange 11 about the opening. The head 1 passes outwardly through the opening 18, the ball 2 engaging the inner surface of the flange 11. The tubular body 12 preferably is milled externally, so that it may be rotated readily.

A tubular foot 15 extends within the body 12 and has an external thread 16 coöperating with a similar internal thread on the body. The foot 15 is provided with an internal thread 17 adapted to engage the coupling on the end of a hose, or any other suitable source of water supply.

In practical operation the head 1 has a swiveled movement in the opening 18 of the body 12 but, by advancing the foot 15 in the body 12, the ball 2 of the head 1 will be clamped between the flange 11 and the inner end of the foot, and thus, the head 1 may be held with its axis at various angles to the axis of the body 12 and the foot 15. It is obvious that owing to the adjustment above mentioned, the water proceeding through the slots 4, 5 and 6 may project at different angles with respect to the horizontal.

If the device is held in the hand, the operator will not be wet, because the slots, 4, 5 and 6 are so fashioned in the side of the head 1 as to prevent such a contingency. Each of the slots, 4, 5 and 6 has its individual intake passage, 7, 8 or 9, and thus an even spray will always be secured, the passages 7, 8 and 9 being of different diameters depending upon the distance of the slots from the source of water supply.

It has been pointed out hereinbefore that the rear walls of the slots 4, 5 and 6 are straight, as shown at 10. This construction is not insisted upon. Thus, in Fig. 5, where the modification appears the walls 10ᵃ of the slot 4ᵃ are disposed at an acute angle to each other, the head being denoted by the numeral 1ᵃ, and the numeral 7ᵃ marking the passage which leads to the slot 4ᵃ. In a device constructed as shown in Fig. 5, it is possible to water a lawn, from one corner, without wetting the walks which may extend along the sides of the lawn. In general, the slots may be shaped as desired, so as to confine the lateral discharge to any desired area.

Having thus described the invention, what is claimed is:—

1. A nozzle comprising a head having separate longitudinal outer and inner passages and an intermediate passage, the passages being of different lengths, the head being provided with transverse slots opening in a common direction and communicating at their inner ends with the inner ends of the respective passages, the slots which communicate with the outer and inner passages converging as they extend inwardly, and the slot which communicates with the intermediate passage being disposed at right angles to the axis of the head, the slots being spaced from each other longitudinally of the head.

2. A device of the class described constructed as set forth in claim 1, and further characterized by the fact that the passages are of different diameters, the head being provided with a single chamber wherewith the outer ends of all of the passages communicate.

In testimony that we claim the foregoing as our own, we have hereto affixed our signatures in the presence of two witnesses.

JENNINGS GRANT AMBROSE.
HENRY W. AMBROSE.

Witnesses:
C. B. Hansen,
J. C. Wilkinson.